US011299597B2

(12) United States Patent
Toda et al.

(10) Patent No.: US 11,299,597 B2
(45) Date of Patent: Apr. 12, 2022

(54) FLAME RETARDANT FOAM AND MANUFACTURING METHOD OF FLAME RETARDANT FOAM

(71) Applicant: Eco Research Institute Ltd., Tokyo (JP)

(72) Inventors: Masakazu Toda, Osaka (JP); Takehiro Yano, Tokyo (JP)

(73) Assignee: Eco Research Institute Ltd., Tokyo (JP)

( * ) Notice: Subject to any disclaimer, the term of this patent is extended or adjusted under 35 U.S.C. 154(b) by 45 days.

(21) Appl. No.: 16/467,961

(22) PCT Filed: Dec. 15, 2017

(86) PCT No.: PCT/JP2017/045055
§ 371 (c)(1),
(2) Date: Jun. 8, 2019

(87) PCT Pub. No.: WO2018/110691
PCT Pub. Date: Jun. 21, 2018

(65) Prior Publication Data
US 2019/0345303 A1 Nov. 14, 2019

(30) Foreign Application Priority Data

Dec. 16, 2016 (JP) .............................. JP2016-244409
Apr. 18, 2017 (JP) .............................. JP2017-081959

(51) Int. Cl.
*C08J 9/00* (2006.01)
*C08L 23/12* (2006.01)
*C08L 1/02* (2006.01)
*C08L 3/02* (2006.01)
*C08K 3/32* (2006.01)
*C08K 3/36* (2006.01)

(52) U.S. Cl.
CPC ........... *C08J 9/0061* (2013.01); *C08J 9/0038* (2013.01); *C08K 3/36* (2013.01); *C08L 1/02* (2013.01); *C08L 3/02* (2013.01); *C08L 23/12* (2013.01); *C08J 2201/03* (2013.01); *C08J 2303/00* (2013.01); *C08J 2323/26* (2013.01); *C08J 2401/02* (2013.01); *C08K 2003/323* (2013.01); *C08K 2003/325* (2013.01)

(58) Field of Classification Search
CPC ............... C08J 2301/02; C08J 9/00–42; C08J 2301/00–06; C08J 2397/00–02; C08J 2401/00–06; C08J 2497/00–02; C08L 9/00–42; C08L 1/00–06; C08L 23/00–24; C08L 23/26; C08L 97/02; C08L 99/00
See application file for complete search history.

(56) References Cited

U.S. PATENT DOCUMENTS

| | | | |
|---|---|---|---|
| 5,352,709 A | 10/1994 | Tarrant | |
| 5,779,960 A | 7/1998 | Berlowitz-Tarrant | |
| 2006/0194902 A1* | 8/2006 | Nie | C08L 23/10 524/47 |
| 2007/0213238 A1* | 9/2007 | Sigworth | C08L 23/02 508/555 |
| 2007/0259168 A1* | 11/2007 | Reedy | B29C 44/12 428/304.4 |
| 2011/0244217 A1 | 10/2011 | Matsushita | |
| 2011/0244223 A1 | 10/2011 | Matsushita | |

FOREIGN PATENT DOCUMENTS

| | | | |
|---|---|---|---|
| CN | 101905133 A | * 12/2010 | |
| CN | 104629203 A | * 5/2015 | |
| JP | H09-500148 A | 1/1997 | |
| JP | 2001342355 A | * 11/2001 | |
| JP | 2003-335887 A | 11/2003 | |
| JP | 2004-002613 A | 1/2004 | |
| JP | 2009-221451 A | 10/2009 | |
| JP | 2011-213966 A | 10/2011 | |
| JP | 2013-170207 A | 9/2013 | |
| JP | 2015-017188 A | 1/2015 | |
| KR | 10-1426694 B1 | 8/2014 | |
| WO | WO-2010010010 A1 | * 1/2010 | C08G 18/4238 |

OTHER PUBLICATIONS

Machine Translation of CN104629203A. May 20, 2015. (Year: 2015).*
Machine Translation of CN101905133A. Dec. 8, 2010. (Year: 2010).*
Machine Translation of WO2010010010A1. Jan. 28, 2010 (Year: 2010).*
Machine Translation of JP2001342355A. Dec. 14, 2001. (Year: 2001).*
Machine Translation of JP2004002613A. Jan. 8, 2004. (Year: 2004).*
Machine Translation of JP2009221451A. Oct. 1, 2009 (Year: 2009).*
Machine Translation of JP2013-170207A. Sep. 2, 2013. (Year: 2013).*
International Search Report (ISR) and Written Opinion (WO) for corresponding International Application PCT/JP2017/045055, dated Mar. 20, 2018.
Korean Office Action with corresponding application No. 10-2019-7017170 dated Aug. 28, 2020.

* cited by examiner

*Primary Examiner* — Stephen E Rieth
(74) *Attorney, Agent, or Firm* — Renner, Otto, Boisselle & Sklar, LLP

(57) ABSTRACT

The flame retardant foam is a molded form of a mixture containing at least a cellulose containing powder, a hydrophilic polymer, a foamable thermoplastic resin, a flame retardant, and water. The mixture contains at least one of tricalcium phosphate or silica as a dispersant.

10 Claims, No Drawings

FLAME RETARDANT FOAM AND MANUFACTURING METHOD OF FLAME RETARDANT FOAM

TECHNICAL FIELD

The present invention relates to flame retardant foams and manufacturing methods of the flame retardant foams.

BACKGROUND ART

Conventionally, various kinds of resin-based foams have been known as heat insulating materials and buffer materials. For example, as the heat insulating materials used for buildings such as houses, mineral-based heat insulating materials such as grass wool and rock wool, heat insulating materials containing natural components such as cellulose fibers and carbonized foamed cork, resin-based foamable heat insulating materials such as hard urethane foam and polystyrene foam. The ingredients and the manufacturing methods of these foams have been researched and developed for improvements, considering from various standpoints such as uses and desired properties.

For example, there have been problems with conventional foams that smoke is generated when the foams are combusted for disposal and that high combustion calories per unit weight affect the environment. The solutions to such problems have been proposed. For example, in one proposed solution, paper powder having a certain average particle size and a hydrophilic polymer at certain amounts are provided to an extruder and mixed while being heated, and then water and a certain thermoplastic resin are added to the high temperature melted material in order to obtain a foam (patent literature 1).

In the foam disclosed in the patent literature 1, since the foamable polypropylene and a certain kind of polypropylene as the thermoplastic resins and polyethylene are added at certain amounts, foamability and heat insulation property are good, as well as the generation of smoke and the effect on the environment are suppressed.

In terms of the foams as the heat insulating materials, various research and developments have been carried out as mentioned above. However, there has been not necessarily enough research and developments carried out to provide flame retardancy as well as a heat insulation property to the foam as the heat insulating materials for houses. Generally, there is a tendency of a decrease in flame retardancy when the foamability is improved to lower the density in order to gain the excellent heat insulation property, since it mean that a large amount of air is included. Therefore, it is not easy to realize both of the excellent heat insulation property and the excellent flame retardancy. In this regard, there still exist possibilities for improvements for the proposed solution in the patent literature 1.

CITATION LIST

Patent Literature

Patent Literature 1: JP2011-213966A

SUMMARY OF INVENTION

The present invention was made according to the above explained circumstances and aims to provide a flame retardant foam having a high heat insulation property and excellent flame retardancy and a manufacturing method of the flame retardant foam.

In order to solve the above problem, the flame retardant foam of the present invention is a molded form of a mixture containing at least a cellulose containing powder, a hydrophilic polymer, a foamable thermoplastic resin, a flame retardant, and water. The mixture contains at least one of tricalcium phosphate or silica as a dispersant.

The manufacturing method of the flame retardant foam of the present invention includes a mixing step which prepares the mixture by mixing at least the cellulose containing powder, the hydrophilic polymer, the flame retardant, the tricalcium phosphate or the silica as the dispersant, and the water. The manufacturing method of the flame retardant foam of the present invention also includes a particle-forming step which makes the mixture obtained in the mixing step into particles and an extrusion and foaming step in which the particles obtained in the particle-forming step and the foamable thermoplastic resin are mixed and heated in an extruder and formed into a foam.

According to the present invention, the flame retardant foam having the high heat insulation property and the excellent flame retardancy and the manufacturing method of the flame retardant foam can be provided.

DESCRIPTION OF EMBODIMENTS

Hereinafter, a flame retardant foam of the present embodiment and a manufacturing method of the flame retardant foam are explained in detail.

(Flame retardant foam)

The flame retardant foam is a molded form of a mixture containing at least a cellulose containing powder, a hydrophilic polymer, a foamable thermoplastic resin, a flame retardant, and water. The mixture contains tricalcium phosphate or silica as a dispersant The cellulose containing powder may be one of wood powder which contains cellulose and is obtained by pulverizing hardwoods and conifers and paper powder which is obtained by pulverizing used paper, or a combination of the wood powder and the paper powder mixed at certain amounts.

The ingredients of the paper powder may include: paper rolls of industrial wastes; various used paper such as newspaper, magazines, print paper, packaging paper, cardboard, and office paper; broken paper and defect paper obtained during manufacturing of virgin paper; remaining wastes when magazines are cut; powder resulting from polishing and abrasion; and shredder wastes.

An average particle size of the cellulose containing powder is preferably within a range of 30 μm or more and 200 μm or less. Also, an amount of the cellulose containing powder with respect to a total amount of the mixture is preferably within a range of 10 mass % or more and 20 mass % or less, and more preferably within a range of 13 mass % or more and 15 mass % or less. When the average particle size and the amount of the cellulose containing powder are within the above ranges, the flame retardant foam having an appropriate thermal conductivity can be obtained.

In general, in a case where the amount of the cellulose containing powder is too large, sizes of the air bubbles tend to be small, leading to high density. As a result, the thermal conductivity tends to become large (meaning that a heat insulation property tends to become worse). On the other hand, in a case where the amount of the cellulose containing powder is too low, the sizes of the air bubbles tend to be large, leading to low density; however, the thermal conductivity tends to become large (meaning that a heat insulation property tends to become worse) in this case as well, due to flows of air within the air bubbles.

Note that the average particles sizes of the materials used for the flame retardant foam of the present embodiment can be measured by using, for example, a commercially available laser diffraction particle size distribution analyzer (Mastersizer S manufactured by Marvern Instruments Ltd.).

The hydrophilic polymer may be at least one of a hydrophilic natural polymer and a hydrophilic synthetic polymer.

The hydrophilic natural polymer may include, for example, starch, Nikawa (glue), natural rubber, and agar. Out of these materials, the starch can be especially preferably used. Specific kinds of the starch are not especially limited, and industrial starch and starch contained in corns, sweet potatoes, potatoes, wheat, barley, and rice.

The hydrophilic synthetic polymer may include, for example, polyvinyl alcohol, an acrylate, and a maleate. Note that the hydrophilic polymer may consist of one compound or consist of two or more kinds of compounds in combination.

An amount of the hydrophilic polymer with respect to the total amount of the mixture is preferably within a range of 20 mass % or more and 30 mass % or less, and more preferably within a range of 24 mass % or more and 28 mass % or less. Also, the amount of the hydrophilic polymer with respect to the amount of the cellulose containing powder is preferably 1.5 times or more and 2.5 times or less by mass. With the amount of the hydrophilic polymer being within the above ranges, the flame retardant foam having appropriate sizes of the air bubbles can be obtained.

A foamable polyolefin-containing resin is preferably used as the foamable thermoplastic resin. Specifically, foamable polypropylene can be used.

In general, since normal polypropylene has poor tension in its melted state, the normal polypropylene has low foamability and thus is not used as an optimal material for foams. In this regard, the foamable thermoplastic resin has been developed in recent years, which are the polypropylenes having higher tension when melted. For example, "Newfoamer (registered trademark)" manufactured by Japan Polypropylene Corporation is commercially available as such foamable thermoplastic resin. Such foamable thermoplastic resins can be favorably used for the flame retardant foam of the present embodiment.

Also, the flame retardant foam of the present embodiment may contain a normal thermoplastic resin in addition to the foamable thermoplastic resin. A polyolefin-containing resin can be used as the normal thermoplastic resin. Specifically, the normal thermoplastic resin may include one of polypropylene and polyethylene, or a combination of the polypropylene and the polyethylene mixed at certain amounts. In a case where the normal thermoplastic resin is contained, an amount of the normal thermoplastic resin is generally preferably a half or less of the amount of the foamable thermoplastic resin by mass.

Examples of the polypropylene may include block-polymerized polypropylene, random-polymerized polypropylene, homo-polymerized polypropylene, and metallocene-polypropylene. Examples of the polyethylene may include low density polyethylene, linear low density polyethylene, medium density polyethylene, high density polyethylene, and metallocene-polyethylene.

Also, the flame retardant foam of the present embodiment can also contain a resin foaming facilitator in addition to the foamable thermoplastic resin and the normal thermoplastic resin. Anhydrous fumaric acid-modified polyolefin is preferably used as the resin foaming facilitator. In general, an amount of the resin foaming facilitator is preferably one twentieth or less of the amount of the foamable thermoplastic resin by mass.

The anhydrous fumaric acid-modified polyolefin can function to exist and improve adhesiveness between the cellulose containing powder and the thermoplastic resin and between the hydrophilic polymer and the thermoplastic resin. Specifically, since the olefin chain in the anhydrous fumaric acid-modified polyolefin is miscible with, for example, polypropylene and the branches of anhydrous fumaric acid in the anhydrous fumaric acid-modified polyolefin reacts well with an OH group of starch and paper powder, the anhydrous fumaric acid-modified polyolefin is considered to function as a surfactant.

A total amount of the foamable thermoplastic resin, the normal thermoplastic resin, and the resin foaming facilitator with respect to the total amount of the mixture is preferably within a range of 25 mass % or more and 40 mass % or less, and more preferably within a range of 31 mass % or more and 33 mass % or less. With the total amount of the foamable thermoplastic resin, the normal thermoplastic resin, and the resin foaming facilitator being within the above range, the flame retardant foam having appropriated sizes of the air bubbles can be obtained. If the total amount of the foamable thermoplastic resin, the normal thermoplastic resin, and the resin foaming facilitator is too large, the sizes of the air bubbles tend to become large, leading to high thermal conductivity and a poor heat insulation property. If the total amount is too small, the sizes of the air bubbles tend to become small, leading to poor foaming.

The flame retardant may include: a halogen flame retardant such as a bromine containing flame retardant and a chlorine containing flame retardant; a phosphorus flame retardant such as a phosphate ester, red phosphorus, and an inorganic phosphate; and an inorganic hydrate flame retardant such as aluminum hydroxide and magnesium hydroxide.

In the flame retardant foam of the present embodiment, the inorganic phosphate which is the phosphorus flame retardant is favorably used, in terms of almost no resin modification, less generation of gas during combustion, and low toxicity.

Also, the flame retardant preferably contains at least ammonium polyphosphate and ammonium phosphate. A ratio of an amount of the ammonium polyphosphate to an amount of the ammonium phosphate is preferably within a range of 3:7 to 7:3. The amount of the ammonium polyphosphate is preferably about same as the amount of the ammonium phosphate. Using the combination of the flame retardant which is a polymer and the flame retardant which is a monomer is preferable since the high flame retardancy can be maintained compared to a case where only the flame retardant which is a polymer such as, for example, the ammonium polyphosphate is used, as well as the mixing amount of the flame retardant required can be reduced.

It is considered that using the combination of such two kinds of flame retardants is preferable due to formation of foam from both of the substance which combusts at gas phase and the substance which combusts at solid phase. In other words, the foam is formed from both of the substance, such as the thermoplastic resin, from which flammable gas is released and which combusts at gas phase in an appropriate concentration of oxygen in air and the substance, such as the cellulose containing powder and the hydrophilic polymer, which combusts at solid phase on a surface of a solid. Therefore, using two kinds of the flame retardants in combination is considered to work effectively against the different types of combustions.

A mixing amount of the flame retardant with respect to the total amount of the mixture is preferably within a range of 5 mass % or more and 20 mass % or less. With the mixing amount of the flame retardant being within the above range, the flame retardant foam having the good foamability and the excellent flame retardancy can be obtained. If the mixing amount of the flame retardant is too large, foaming of the flame retardant foam ends up poor, while if the amount of the flame retardant is too small, the flame retardant foam ends up with unsatisfactory flame retardancy.

The flame retardant foam of the present embodiment may preferably contain a polyalcohol, melamine, or a melamine compound as a flame retardant facilitator.

Pentaerythritol is preferably used as the polyalcohol. In a case where the polyalcohol such as pentaerythritol is added as the flame retardant facilitator, the polyalcohol gives oxygen atoms to the polypropylene, and only a carbon layer remains by dehydration reaction. Since this carbon layer prevents fire from spreading out, the flame retardancy of the flame retardant foam can be easily exhibited. Also, the melamine and the melamine compound such as melamine cyanurate and melamine polyphosphate can form a foam layer by heating. Since this foam layer prevents fire from spreading out, the flame retardancy of the flame retardant foam can be easily exhibited.

Tricalcium phosphate and silica as the dispersant are added to improve the dispersibilities of the cellulose containing powder, the hydrophilic polymer, the flame retardant, and the foamable thermoplastic resin and to obtain the more even mixture. An inorganic dispersant is preferably used as the dispersant. If an organic dispersant is used, the flame retardancy might lower. The dispersant is preferably hardly soluble in water. Each of the tricalcium phosphate and the silica can be used alone, or both can be used in combination.

Examples of the silica used as the dispersant may include spherical silica, fused silica, and crystalline silica. The above exemplified silica may be used alone or in combination.

A mixing amount of the tricalcium phosphate or the silica with respect to the total amount of the mixture is within a range of 2 mass % or more and 8 mass % or less, and preferably within a range of 5 mass % or more and 7.5 mass % or less. If the mixing amount of the dispersant is too small, the dispersibilities are not exhibited enough, while if the mixing amount of the dispersant is too large, it becomes difficult to form particles from the mixture. An average particle size of the dispersant is preferably within a range of 4 µm or more and 7 µm or less. If the average particle size of the dispersant is not within this range, foaming might not occur properly.

A bulk density of the dispersant in terms of a loose bulk density (loosely filled density) is preferably 0.6 g/cm$^3$ or lower when measured using a powder characteristics tester (for example, Powder Tester (registered trademark) PT-X manufactured by Hosokawa Micron Corporation). A bulk density of the dispersant in terms of a packed bulk density (densely filled density) is preferably 1.0 g/cm$^3$ or lower when measured using the powder characteristics tester mentioned above.

With the mixing amount, the average particle size, and the bulk density of the dispersant being within the above ranges, cluttering of the flame retardant especially in the cellulose containing powder and the hydrophilic polymer can be prevented, leading to the improvement in the foaming rate and the flame retardancy.

In general, the flame retardancy tends to lower as the foaming rate increases and the density of the foam decreases with an increase of air within the foam. However, in a case were the dispersant is added, the flame retardancy can be improved as the same time the foaming rate is increased (and the density is decreased). Due to this, the flame retardant foam having the excellent flame retardancy and the high heat insulation property can be obtained.

The flame retardant foam of the present embodiment may contain a powdery resin foaming facilitator or a liquid resin foaming facilitator in order to adjust the foaming state. Specifically, an acryl-modified fluoro resin may be used as the powdery resin foaming facilitator and a silicone surfactant may be used as the liquid resin foaming facilitator.

In a case where the acryl-modified fluoro resin is used, the tension of the thermoplastic resin at its melted state can be improved and foaming is accelerated. In a case where the silicone surfactant is used, the surfactant connects hydrophilic substances and hydrophobic substances and the foaming rate can be improved.

The flame retardant foam of the present embodiment can contain other additives in addition to the components described above, as long as the effects of the present invention are not inhibited. Examples of the additive may include an anti-oxidant, an anti-fungal agent, and a coloring agent.

(Manufacturing method of flame retardant foam)

Next, one embodiment of a manufacturing method of the flame retardant foam is explained.

The manufacturing method of the flame retardant foam of the present embodiment includes a mixing step which prepares the mixture by mixing at least the cellulose containing powder, the hydrophilic polymer, the flame retardant, the tricalcium phosphate or the silica as the dispersant, and the water. The manufacturing method of the flame retardant foam of the present embodiment also includes a particle-forming step which makes the mixture obtained in the mixing step into particles. Furthermore, the manufacturing method of the flame retardant foam of the present embodiment includes an extrusion and foaming step in which the particles obtained in the particle-forming step and the foamable thermoplastic resin are mixed and heated in an extruder and formed into a foam.

In the mixing step, the cellulose containing powder, the hydrophilic polymer, the flame retardant including the flame retardant facilitator, the tricalcium phosphate or the silica as the dispersant, and the water are mixed at certain amounts to prepare the mixture. Also, in the mixing step, the powdery and the liquid resin-foaming facilitator or other ingredients may be added. In the mixing step, a mixer such as a ribbon mixer or a henschel mixer can be used.

In the mixing step, the inorganic phosphates of the same kind, with one of which being a hardly water soluble substance and other of which being a water soluble substance, such as at least ammonium polyphosphate and ammonium phosphate, are preferably used in combination as the flame retardant. Further, the ammonium phosphate which is water soluble is preferably dissolved in water or in warm water in advance before being mixed with other ingredients. In a case where the ammonium phosphate is dissolved in water or in warm water in advance before mixing, the ammonium phosphate can be dispersed more evenly and also can be easily absorbed by the cellulose containing powder and the hydrophilic polymer. Due to this, the flame retardancy of the flame retardant foam can be improved.

An amount of water added in the mixing step with respect to a total amount of the mixture is within a range of 8 mass % or more and 15 mass % or less, and preferably within a range of 10 mass % of more and 11.5 mass % or less. In a case where the amount of water is within the above range, the subsequent particle formation is facilitated and the flame retardant foam with an appropriate foaming condition can be obtained.

In the particle-forming step, the mixture obtained in the mixing step is formed into particles of certain shapes and sizes. The shapes of the particles may vary, such as a pellet, a sphere, and a disk. The sizes of the particles also may vary. Preferably, for example, the mixture can be extruded from a pellet forming extruder in string forms, which can be then cut into pellets.

Next, in the extrusion and foaming step, the particles such as pellets prepared in the particle-forming step, the foamable thermoplastic resin, and if necessary the normal thermoplastic resin and anhydrous fumaric acid-modified polyolefin as the resin foaming facilitator are added to an extruder for foam manufacturing such as a twin screw extruder.

Inside the extruder, the particles such as pellets as well as the thermoplastic resin are heated, and the components are mixed evenly by a screw in the extruder and a high temperature melted material is obtained.

Inside the extruder, the cellulose containing powder, the hydrophilic polymer, the flame retardant, the dispersant, and the water which constitute the particles such as pellets are heated and mixed with other components such as the foamable thermoplastic resin. In this process, the dispersant contributes to even mixing of the components, and thereby the high temperature melted material is be obtained.

In the manufacturing method of the flame retardant foam of the present embodiment, water can be further added in the extrusion and foaming step. When the water is added to a cylinder of the extruder in the extrusion and foaming step, an amount of water contained in the high temperature melted material can be adjusted. The temperature of the water contained in the high temperature melted material at this point is higher than 100° C.; however, since the pressure within the cylinder of the extruder is maintained high, the water does not vaporize. Then, at the point when the high temperature melted material is extruded from the die attached at the tip of the extruder, the high temperature melted material is freed to the atmospheric pressure, and thereby the water vaporizes within the melted material forming bubbles inside. Due to this, the melted material expands. The expansion rate of the melted material with respect to the original volume is preferably about 20 times or more and 40 times or less per unit volume. The amount of water added is adjusted so that the expansion rate lies within the above range. Also, warm water heated to a desired temperature can be added to adjust the temperature of the melted material.

The high temperature melted material is extruded from the die attached to the tip of the extruder and cooled. In a case where a die with multiple small holes is used in this process, the high temperature melted material which is extruded from the small holes appropriately expands and forms multiple stick-like foams, whose outer surfaces adhere to each other, forming a board. Note that, in the manufacturing method of the flame retardant foam of the present embodiment, dies with different shapes can be used to obtain the flame retardant foam in a desired shape such as a sheet as well as a board. A density of the flame retardant foam is preferably within a range of 20 kg/m$^3$ or more and 50 kg/m$^3$ or less, and more preferably within a range of 25 kg/m$^3$ or more and 35 kg/m$^3$ or less, in terms of cost and strength.

By employing the above explained manufacturing method of the flame retardant foam of the present embodiment, the flame retardant foam having the high heat insulation property and the excellent flame retardancy can be manufactured.

Hereinafter, the flame retardant foam and the manufacturing method of the flame retardant foam of the present invention are further explained in detail, referring to examples; however the present invention is not limited to the following examples.

EXAMPLES

Examples 1 to 3

Following compounds are used as the thermoplastic resins (the foamable thermoplastic resin, the normal thermoplastic resin, and the resin-foaming facilitator), the hydrophilic polymer, the cellulose containing powder, the flame retardant (including the flame retardant facilitator), the dispersant, and the resin-foaming facilitator. The properties of the dispersants are shown in the Table 1. Note that the bulk density in the Table 1 is measured by using a powder characteristics tester (Powder Tester (registered trademark) PT-X manufactured by Hosokawa Micron Corporation).

Foamable thermoplastic resin: foamable polypropylene (FTS4000 manufactured by Japan Polypropylene Corporation)

Normal thermoplastic resin: polypropylene (BC8 manufactured by Japan Polypropylene Corporation)

Resin-foaming facilitator: anhydrous fumaric acid-modified polyolefin (Fusabond P613 manufactured by DuPont)

Hydrophilic polymer: starch (H-100 manufactured by Kato Kagaku Co., Ltd.)

Cellulose containing powder: paper powder (average particle size of 40 to 70 μm)

Flame retardant (including the flame retardant facilitator): mixture of ammonium polyphosphate, pentaerythritol, and melamine (Taien E manufactured by Taihei Chemical Industrial Co., Ltd.), ammonium phosphate (Taien N manufactured by Taihei Chemical Industrial Co., Ltd.)

Dispersant: tricalcium phosphate (tricalcium phosphate manufactured by Taihei Chemical Industrial Co., Ltd.)

Resin-foaming facilitator (powder): acryl-modified fluoro resin (METABLEN A-3000 manufactured by Mitsubishi Rayon Co., Ltd.)

Resin-foaming facilitator (liquid): silicone surfactant (SH193 manufactured by Dow Corning Toray Co., Ltd.)

First, pellets were prepared by the mixing step and the particle-forming step using the hydrophilic polymer, the cellulose containing powder, the flame retardant (including the flame retardant facilitator), the dispersant, the resin-foaming facilitator (powder), the resin-foaming facilitator (liquid), and water out of the ingredients above, at amounts shown in the Table 2. Note that the amounts in the Table 2 are in mass %.

Next, the pellets prepared in the particle-forming step and the thermoplastic resin (the foamable thermoplastic resin, the normal thermoplastic resin, and the resin-foaming facilitator) were added to an extruder at amounts shown in the Table 2 and then mixed while being heated, which was then extruded to obtain the flame retardant foams of the examples 1 to 3.

Example 4

Except using silica (1) (ACEMATT (registered trademark) HK 400 manufactured by Evonik (Evonik industries AG)) shown in the Table 1 as the dispersant, the flame retardant foam of the example 4 was obtained based on the amounts in the Table 2 in the same manner as the examples 1 to 3.

Example 5

Except using silica (2) (ACEMATT (registered trademark) OK 520 manufactured by Evonik (Evonik industries AG)) shown in the Table 1 as the dispersant, the flame retardant foam of the example 5 was obtained based on the amounts in the Table 2 in the same manner as the examples 1 to 3.

Comparative Example 1

Except that the dispersant was not used, the flame retardant foam of the comparative example 1 was obtained based on the amounts in the Table 2 in the same manner as the examples 1 to 3.

Comparative Example 2

Except using calcium carbonate (1) (Softon 3200 manufactured by Bihoku Funka Kogyo Co., Ltd.) shown in the Table 1 as the dispersant, the flame retardant foam of the comparative example 2 was obtained based on the amounts in the Table 2 in the same manner as the examples 1 to 3.

Comparative Example 3

Except using calcium carbonate (2) (BF200 manufactured by Bihoku Funka Kogyo Co., Ltd.) shown in the Table 1 as the dispersant, the flame retardant foam of the comparative example 3 was obtained based on the amounts in the Table 2 in the same manner as the examples 1 to 3.

Comparative Example 4

Except using calcium carbonate (3) (BF400 manufactured by Bihoku Funka Kogyo Co., Ltd.) shown in the Table 1 as the dispersant, the flame retardant foam of the comparative example 4 was obtained based on the amounts in the Table 2 in the same manner as the examples 1 to 3.

Comparative Example 5

Except using the organic dispersant (1) (GANZPEARL GB-05S manufactured by Aica Kogyo Co., Ltd.) shown in the Table 1 as the dispersant, the flame retardant foam of the comparative example 5 was obtained based on the amounts in the Table 2 in the same manner as the examples 1 to 3.

Comparative Example 6

Except using the organic dispersant (2) (GRANDPEARL GU-0700P manufactured by Aica Kogyo Co., Ltd.) shown in the Table 1 as the dispersant, the flame retardant foam of the comparative example 6 was obtained based on the amounts in the Table 2 in the same manner as the examples 1 to 3.

TABLE 1

| Dispersant Compound name | Product name | Inorganic or Organic | Average particle size (μm) | Bulk density (g/cm$^3$) Loose | Bulk density (g/cm$^3$) Packed | Water solubility |
|---|---|---|---|---|---|---|
| Tricalcium phosphate | Tricalcium phosphate manufactured by Taihei Chemical Industrial Co., Ltd. | Inorganic | 4~6 | 0.244 | 0.523 | Hardly soluble in water |
| Silica (1) | ACEMATT(registered trademark) HK400 manufactured by Evonik Co., Ltd. | Inorganic | 6.5 | 0.089 | 0.137 | Hardly soluble in water |
| Silica (2) | ACEMATT(registered trademark) OK520 manufactured by Evonik Co., Ltd. | Inorganic | 6.5 | 0.054 | 0.087 | Hardly soluble in water |
| Calcium carbonate (1) | Softon 3200 manufactured by Bihoku Funka Kogyo Co., Ltd. | Inorganic | 0.7 | 0.365 | 0.695 | Hardly soluble in water |
| Calcium carbonate (2) | BF200 manufactured by Bihoku Funka Kogyo Co., Ltd. | Inorganic | 5 | 0.7 | 1.455 | Hardly soluble in water |
| Calcium carbonate (3) | BF400 manufactured by Bihoku Funka Kogyo Co., Ltd. | Inorganic | 13 | 1.019 | 1.489 | Hardly soluble in water |
| Organic dispersant (1) | GANZPEARL GB-05S manufactured by Aica Kogyo Co., Ltd. | Organic | 5 | 0.356 | 0.588 | Hardly soluble in water |
| Organic dispersant (2) | GRANDPEARL GU-0700P manufactured by Aica Kogyo Co., Ltd. | Organic | 7 | 0.403 | 0.621 | Hardly soluble in water |

TABLE 2

| Material | Compound name | Examples 1 | 2 | 3 | 4 | 5 |
|---|---|---|---|---|---|---|
| Foamable thermoplastic resin | Foamable polypropylene | 22.2 | 22.2 | 22.2 | 22.2 | 22.2 |
| Normal thermoplastic resin | Polypropylene | 9.5 | 9.5 | 9.5 | 9.5 | 9.5 |
| Resin-foaming facilitator | Anhydrous fumaric acid-modified polyolefin | 0.3 | 0.3 | 0.3 | 0.3 | 0.3 |
| Hydrophilic polymer | Starch | 27.7 | 26.1 | 24.7 | 26.1 | 26.1 |
| Cellulose containing powder | Paper powder | 14.9 | 14.1 | 13.3 | 14.1 | 14.1 |

TABLE 2-continued

| Material | Compound name | | | | | |
|---|---|---|---|---|---|---|
| Flame retardant (including flame retardant facilitator) | Mixture of ammonium polyphosphate, pentaerythritol, and melamine | 5.3 | 5.3 | 5.3 | 5.3 | 5.3 |
| | Ammonium phosphate | 5.3 | 5.3 | 5.3 | 5.3 | 5.3 |
| Dispersant | Tricalcium phosphate | 2.5 | 5.3 | 7.5 | — | — |
| | Silica (1) | — | — | — | 5.3 | — |
| | Silica (2) | — | — | — | — | 5.3 |
| | Calcium carbonate (1) | — | — | — | — | — |
| | Calcium carbonate (2) | — | — | — | — | — |
| | Calcium carbonate (3) | — | — | — | — | — |
| | Organic dispersant (1) | — | — | — | — | — |
| | Organic dispersant (2) | — | — | — | — | — |
| Resin-foaming facilitator (powder) | Acryl-modified fluoro resin | 1 | 1 | 1 | 1 | 1 |
| Resin-foaming facilitator (liquid) | Silicone surfactant | 0.2 | 0.2 | 0.2 | 0.2 | 0.2 |
| | Water | 11.1 | 10.7 | 10.7 | 10.7 | 10.7 |
| | Total | 100 | 100 | 100 | 100 | 100 |

| | | Comparative examples | | | | | |
|---|---|---|---|---|---|---|---|
| Material | Compound name | 1 | 2 | 3 | 4 | 5 | 6 |
| Foamable thermoplastic resin | Foamable polypropylene | 22.2 | 22.2 | 22.2 | 22.2 | 22.2 | 22.2 |
| Normal thermoplastic resin | Polypropylene | 9.5 | 9.5 | 9.5 | 9.5 | 9.5 | 9.5 |
| Resin-foaming facilitator | Anhydrous fumaric acid-modified polyolefin | 0.3 | 0.3 | 0.3 | 0.3 | 0.3 | 0.3 |
| Hydrophilic polymer | Starch | 29.4 | 26.1 | 26.1 | 26.1 | 26.1 | 26.1 |
| Cellulose containing powder | Paper powder | 15.8 | 14.1 | 14.1 | 14.1 | 14.1 | 14.1 |
| Flame retardant (including flame retardant facilitator) | Mixture of ammonium polyphosphate, pentaerythritol, and melamine | 5.3 | 5.3 | 5.3 | 5.3 | 5.3 | 5.3 |
| | Ammonium phosphate | 5.3 | 5.3 | 5.3 | 5.3 | 5.3 | 5.3 |
| Dispersant | Tricalcium phosphate | — | — | — | — | — | — |
| | Silica (1) | — | — | — | — | — | — |
| | Silica (2) | — | — | — | — | — | — |
| | Calcium carbonate (1) | — | 5.3 | — | — | — | — |
| | Calcium carbonate (2) | — | — | 5.3 | — | — | — |
| | Calcium carbonate (3) | — | — | — | 5.3 | — | — |
| | Organic dispersant (1) | — | — | — | — | 5.3 | — |
| | Organic dispersant (2) | — | — | — | — | — | 5.3 |
| Resin-foaming facilitator (powder) | Acryl-modified fluoro resin | 1 | 1 | 1 | 1 | 1 | 1 |
| Resin-foaming facilitator (liquid) | Silicone surfactant | 0.2 | 0.2 | 0.2 | 0.2 | 0.2 | 0.2 |
| | Water | 11 | 10.7 | 10.7 | 10.7 | 10.7 | 10.7 |
| | Total | 100 | 100 | 100 | 100 | 100 | 100 |

The flame retardancy, the density, and the heat insulation property of the flame retardant foams of the examples 1 to 5 and the comparative examples 1, 5, and 6 are measured and evaluated based on the following criteria. Note that foaming failure occurred in the extrusion and foaming step for the comparative example 2 which contains calcium carbonate (1) having a small average particle size as the dispersant, the comparative example 3 which contains calcium carbonate (2) having a large bulk density, and the comparative example 4 which contains calcium carbonate (3) having a large average particle size and a large bulk density. Also, in the comparative examples 2, 3, and 4, the flame retardancy, the density, and the heat insulation properties could not be measured since board-shaped or sheet-shaped foams could not be obtained. Since board-shaped or sheet-shaped foams could not be obtained in the comparative examples 2, 3, and 4, the "preparation of foam" in the Table 3 was evaluated as "poor" while in all the other examples and the comparative examples, the "preparation of foam" in the Table 3 was evaluated as "fair".

<Flame Retardancy>

A test sample with a size of 13 mm×50 mm×150 mm was cut out from each of the flame retardant foams of the examples 1 to 5 and the comparative examples 1, 5, and 6. Conforming to the measurement method B in the Appendix B of JIS A 9521 "heat insulating materials for buildings", the combustion time and the combustion distance of the test sample were measured and evaluated as follows.

(Combustion Time)

A: less than 120 seconds

B: longer than or equal to 120 seconds and less than 125 seconds

C: longer than or equal to 125 seconds

Since the short combustion time is regarded as the high flame retardancy, "A" is considered to be satisfactory, "B" is considered to be substantially satisfactory, and "C" is considered to be slightly unsatisfactory.

(Combustion Distance)

Fair: less than 60 mm

Poor: longer than or equal to 60 mm

Since the short combustion distance is regarded as the high flame retardancy, "fair" is considered to be substantially satisfactory, and "poor" is considered to be slightly unsatisfactory.

<Density>

A test sample with a size of 13 mm×50 mm×150 mm was cut out from each of the flame retardant foams of the examples 1 to 5 and the comparative examples 1, 5, and 6. The density was measured for each test sample and evaluated as follows A: 25 to 35 kg/m$^3$ B: 36 to 50 kg/m$^3$ C: larger than or equal to 51 kg/m$^3$ Since the density is smaller, the better, "A" is considered to be satisfactory, "B" is considered to be substantially satisfactory, and "C" is considered to be slightly unsatisfactory.

<Heat Insulation Property>

A test sample with a size of 13 mm×50 mm×150 mm was cut out from each of the flame retardant foams of the examples 1 to 5 and the comparative examples 1, 5, and 6. The thermal conductivity was measured for each test sample and evaluated as follows. Note that the following evaluation standards were set so that a flame retardant foam of the present disclosure with a thickness of 80 mm satisfies an energy saving class of 4 (thermal resistance value of 2.2 m²W/K) in "Act on the Promotion of the Housing Quality Assurance".

Fair: less than 0.036 W/mK
Poor: larger than or equal to 0.036 W/mK

Since the thermal conductivity is smaller, the better, "fair" is considered to be substantially satisfactory and "poor" is considered to be slightly unsatisfactory.

The results of the above measurements and evaluations of the flame retardancy, the density, and the heat insulation property are shown in the Table 3.

comparative example 6 has the extremely low density and the measurements of the combustion time and the combustion distance are not carried out since all the sample was combusted in the combustion test.

From the above results, it was determined that the flame retardant foam having the high heat insulation property and the excellent flame retardancy can be obtained by the manufacturing method of the flame retardant foam of the present embodiment.

The flame retardant foam of the present embodiment has the following features.

The flame retardant foam of the first embodiment is a molded form of a mixture containing at least a cellulose containing powder, a hydrophilic polymer, a foamable thermoplastic resin, a flame retardant, and water. The mixture contains at least one of tricalcium phosphate or silica as a dispersant.

In this case, the dispersant can increase the dispersibilities of the cellulose containing powder, the hydrophilic polymer, the flame retardant and the foamable thermoplastic resin, leading to the more even mixture. Due to this, the flame retardant foam has the high heat insulation property and the excellent flame retardancy.

TABLE 3

| Evaluation list | | Unit Evaluation | Examples 1 | 2 | 3 | 4 | 5 |
|---|---|---|---|---|---|---|---|
| Preparation of foam | | Evaluation | fair | fair | fair | fair | fair |
| Flame retardancy | Combustion time | sec Evaluation | 124 B | 114 A | 81 A | 88 A | 95 A |
| | Combustion distance | mm Evaluation | 35 fair | 45 fair | 37 fair | 32 fair | 35 fair |
| Density | | kg/m³ Evaluation | 46.8 B | 31.8 A | 31 A | 28.9 A | 33.1 A |
| Heat insulation property | Thermal conductivity | W/mk Evaluation | 0.0342 fair | 0.0336 fair | 0.0331 fair | 0.033 fair | 0.0329 fair |
| Overall evaluation | | | fair | fair | fair | fair | fair |

| Evaluation list | | Unit Evaluation | Comparative examples 1 | 2 | 3 | 4 | 5 | 6 |
|---|---|---|---|---|---|---|---|---|
| Preparation of foam | | Evaluation | fair | poor | poor | poor | fair | fair |
| Flame retardancy | Combustion time | sec Evaluation | 288 C | — — | — — | — — | 171 C | — — |
| | Combustion distance | mm Evaluation | 32 fair | — — | — — | — — | 62 poor | — — |
| Density | | kg/m³ Evaluation | 111.7 C | — — | — — | — — | 37.9 B | 24.5 C |
| Heat insulation property | Thermal conductivity | W/mK Evaluation | 0.0397 poor | — — | — — | — — | 0.0331 fair | 0.0324 fair |
| Overall evaluation | | | poor | poor | poor | poor | poor | poor |

As shown in the Table 3, all of the examples 1 to 5 which contains the tricalcium phosphate or the silica as a dispersant are evaluated as fair in the overall evaluation based on the flame retardancy, the density, and the heat insulation property. Note that in the overall evaluation, the examples having "fair", "A", or "B" only are considered overall "fair" without a major problem. Also, in the overall evaluation, the examples having at least one "poor", "C", or "-" (impossible to evaluate) are considered overall "poor" with a problem which cannot be overlooked.

On the other hand, the comparative example 1 which does not contain the dispersant are evaluated as inferior to the examples 1 to 5 in the combustion time, the density, and the heat insulation property. The comparative examples 5 and 6 which contains organic dispersant are evaluated as inferior to the examples 1 to 5 in the flame retardancy. Note that the In the second embodiment of the flame retardant foam, realized in combination with the first embodiment, the flame retardant preferably contains an inorganic phosphate.

In this case, the resin in the flame retardant foam is hardly modified and thus gas generation during combustion is decreased, leading to the low toxicity.

In the third embodiment of the flame retardant foam, realized in combination with the first or the second embodiment, the flame retardant preferably contains at least ammonium polyphosphate and ammonium phosphate.

In this case, it is considered that the ammonium polyphosphate and the ammonium phosphate can work effectively against the different types of combustions, leading to the improvement in the flame retardancy of the flame retardant foam.

In the fourth embodiment of the flame retardant foam, realized in combination with any one of the first to the third embodiments, a mixing amount of the flame retardant with respect to a total amount of the mixture is preferably within a range of 5 mass % or more and 20 mass % or less. Also, a mixing amount of the dispersant with respect to a total amount of the mixture is preferably within a range of 2 mass % or more and 8 mass % or less.

In this case, the flame retardant foam has the good foaming property and the excellent flame retardancy. Also, the mixture can easily be formed into the particles.

In the fifth embodiment of the flame retardant foam, realized in combination with any one of the first to the fourth embodiments, the mixture preferably contains pentaerythritol.

In this case, the pentaerythritol gives oxygen atoms to the foamable thermoplastic resin such as polypropylene, and only the carbon layer remains by the dehydration reaction. Since this carbon layer prevents fire from spreading out, the flame retardancy of the flame retardant foam can be easily exhibited.

In the sixth embodiment of the flame retardant foam, realized in combination with any one of the first to the fifth embodiments, the mixture preferably contains melamine or a melamine compound.

In this case, the melamine or the melamine compound forms the foam layer by heating. Since this foam layer prevents fire from spreading out, the flame retardancy of the flame retardant foam can be easily exhibited.

In the seventh embodiment of the flame retardant foam, realized in combination with any one of the first to the sixth embodiments, the mixture preferably contains anhydrous fumaric acid-modified polyolefin.

In this case, the anhydrous fumaric acid-modified polyolefin exists between the cellulose containing powder and the thermoplastic resin and also between the hydrophilic polymer and the thermoplastic resin. Due to this, the adhesiveness between the cellulose containing powder and the thermoplastic resin and between the hydrophilic polymer and the thermoplastic resin are increased, leading to the improvement in the foamability of the mixture.

The manufacturing method of the flame retardant foam of the eighth embodiment includes a mixing step which prepares a mixture by mixing at least a cellulose containing powder, a hydrophilic polymer, a flame retardant, at least one of tricalcium phosphate or silica as a dispersant, and water. The manufacturing method of the flame retardant foam also includes a particle-forming step which makes the mixture obtained in the mixing step into particles. Further, the manufacturing method of the flame retardant foam also includes an extrusion and foaming step in which the particles obtained in the particle-forming step and a foamable thermoplastic resin are mixed and heated in an extruder and formed into a foam.

In this case, the dispersant can improve the dispersibilities of the cellulose containing powder, the hydrophilic polymer, the flame retardant, and the foamable thermoplastic resin, leading to the more even mixture. Due to this, the flame retardant foam having the high heat insulation property and the excellent flame retardancy can be obtained.

In the ninth embodiment of the manufacturing method of the flame retardant foam, realized in combination with the eighth embodiment, in the mixing step, the flame retardant is preferably an inorganic phosphate containing at least ammonium polyphosphate and ammonium phosphate. Also, the ammonium phosphate is preferably dissolved in water or in warm water in advance before mixing.

In this case, it is considered that the ammonium polyphosphate and the ammonium phosphate can work effectively against the different types of combustions, leading to the improvement in the flame retardancy of the flame retardant foam. Also, since the ammonium phosphate can be dispersed highly evenly and can be easily absorbed by the cellulose containing powder and the hydrophilic polymer, the flame retardancy of the flame retardant foam can be improved.

In the tenth embodiment of the manufacturing method of the flame retardant foam, realized in combination with the eighth or the ninth embodiment, water is preferably further added in the extrusion and foaming step.

In this case, air bubbles are formed within the melted material when the water vaporizes, leading to the expansion of the melted material. Due to this, the foaming rate of the flame retardant foam can be improved.

The invention claimed is:

1. A flame retardant foam which is a molded form of a mixture containing at least a cellulose containing powder, a hydrophilic polymer, a foamable thermoplastic resin, a flame retardant, and water,
   the cellulose containing powder being one of:
      wood powder which contains cellulose and is obtained by pulverizing hardwoods and conifers;
      paper powder which is obtained by pulverizing used paper, or
      a combination of the wood powder and the paper powder,
   the mixture containing at least one of tricalcium phosphate or silica as a dispersant,
   an average particle size of the dispersant being within a range of 4 μm or more and 7 μm or less,
   a bulk density of the dispersant in terms of a loose bulk density being 0.6 g/cm$^3$ or lower when measured using a powder characteristics tester, and
   a bulk density of the dispersant in terms of a packed bulk density being 1.0 g/cm$^3$ or lower when measured using the powder characteristics tester mentioned above.

2. The flame retardant foam according to claim 1, wherein the flame retardant contains an inorganic phosphate.

3. The flame retardant foam according to claim 1, wherein the flame retardant contains at least ammonium polyphosphate and ammonium phosphate.

4. The flame retardant foam according to claim 1, wherein a mixing amount of the flame retardant with respect to a total amount of the mixture is within a range of 5 mass % or more and 20 mass % or less, and
   a mixing amount of the dispersant with respect to a total amount of the mixture is within a range of 2 mass % or more and 8 mass % or less.

5. The flame retardant foam according to claim 1, wherein the mixture contains pentaerythritol.

6. The flame retardant foam according to claim 1, wherein the mixture contains melamine or a melamine compound.

7. The flame retardant foam according to claim 1, wherein the mixture contains anhydrous fumaric acid-modified polyolefin.

8. A manufacturing method of the flame retardant foam according to claim 1, the method comprising:
   a mixing step which prepares a mixture by mixing at least the cellulose containing powder, the hydrophilic polymer, the flame retardant, at least one of tricalcium phosphate or silica as the dispersant, and water;
   a particle-forming step which makes the mixture obtained in the mixing step into particles; and an extrusion and foaming step in which the particles obtained in the particle-forming step and the foamable thermoplastic resin are mixed and heated in an extruder and formed into a foam.

9. The manufacturing method of a flame retardant foam according to claim 8, wherein
in the mixing step, the flame retardant is an inorganic phosphate containing at least ammonium polyphosphate and ammonium phosphate, and
the ammonium phosphate is dissolved in water in advance before mixing.

10. The manufacturing method of a flame retardant foam according to claim 8, wherein
water is further added in the extrusion and foaming step.

* * * * *